United States Patent [19]

Liot

[11] Patent Number: 4,524,083
[45] Date of Patent: Jun. 18, 1985

[54] RESERVED LIQUID EGGS AND METHOD OF PREPARATION

[75] Inventor: Roger Liot, Creteil, France

[73] Assignee: Roger Liot, S.A., Creteil, France

[21] Appl. No.: 489,984

[22] Filed: Apr. 29, 1983

Related U.S. Application Data

[63] Continuation-in-part of Ser. No. 341,261, Jan. 21, 1982, abandoned, which is a continuation of Ser. No. 196,825, Oct. 14, 1980, abandoned, which is a continuation of Ser. No. 26,052, Apr. 2, 1979, abandoned, which is a continuation of Ser. No. 842,240, Oct. 14, 1977, abandoned.

[30] Foreign Application Priority Data

Oct. 15, 1976 [LU] Luxembourg ............................ 76012

[51] Int. Cl.³ ............................ A23B 5/00; A23L 1/32
[52] U.S. Cl. ................. 426/330.1; 426/298; 426/614
[58] Field of Search ............ 426/330.1, 106, 410, 426/418, 300, 298, 323, 324, 325, 326, 312, 316, 318, 319, 474, 614, 524

[56] References Cited

U.S. PATENT DOCUMENTS

| | | | |
|---|---|---|---|
| 1,724,078 | 8/1929 | Fousek | 426/330.1 |
| 1,900,444 | 3/1933 | Heuser | 426/614 |
| 1,989,359 | 1/1935 | Heuser | 426/330.1 |
| 2,093,786 | 9/1937 | Swarthout et al. | 426/325 |
| 3,409,446 | 11/1968 | Olphen | 426/330.1 |
| 3,419,400 | 12/1968 | Hayhurst et al. | 426/316 |
| 3,615,727 | 10/1971 | Starke | 426/316 |

*Primary Examiner*—George Yeung
*Attorney, Agent, or Firm*—Wegner & Bretschneider

[57] ABSTRACT

A salted- or sugared-raw egg mixture capable of prolonged shelf life comprises whole or separated egg substantially devoid of sufficient oxygen whereby there is avoided recognizable spoilage or deterioration that would result in any noticeable change in appearance that could otherwise occur during a prolonged period under conditions of room temperature. The mixture comprises an uncooked mixture of egg and either salt or sugar, which mixture has an osmotic pressure of at least 20 atm and has not more than 3 ppm oxygen.

16 Claims, No Drawings

RESERVED LIQUID EGGS AND METHOD OF PREPARATION

CROSS-REFERENCE TO RELATED APPLICATIONS

This application is a continuation-in-part application of Ser. No. 341,261, filed Jan. 21, 1982, abandoned, which in turn is a continuation of Ser. No. 196,825, filed Oct. 14, 1980, abandoned, which in turn is a continuation of Ser. No. 26,052, filed Apr. 2, 1979, abandoned, which in turn is a continuation of Ser. No. 842,240, filed Oct. 14, 1977, abandoned.

BACKGROUND OF THE INVENTION

Numerous patents relate to the preservation of egg products. However, these processes either do not truly sterilize the egg products, or the sterilization obtained causes a too significant modification of the liquids, glycides of carbohydrates, and proteins of the eggs.

French Pat. No. 679,991 comprises a process of evaporation in a vacuum, in which sugar is added to the liquid egg product before pasteurization; the effects of the heat are accelerated by evaporation in a vacuum, even at a very low temperature. French Pat. No. 1,271,154 comprises the sterilization of egg products by means other than an elevation of temperature, for example, by a treatment with ultraviolet rays. It is well known that the degradation or deterioration of proteins by heat increases very quickly when heated or even warmed at a reduced pressure. It is also known that a simple pasteurization of egg products for several minutes at atmospheric pressure leads to a significant deterioration of the components of the egg, when the temperature of the treatment attains about 54° C. for egg whites, 60° C. for whole eggs, and 65° C. for egg yolks, being given the conditions of pasteurization.

Swarthout et al, U.S. Pat. No. 2,093,786, treats eggs to a pasteurization process for the conventional purpose of killing bacteria, without recognition that for maximum shelf life, particularly at higher temperatures, it is essential to minimize the oxygen content. White, British Pat. No. 346,031, teaches the placement of an egg product in a container from which the air has been evacuated (page 3, lines 7–19), and teaches the substitution of carbon dioxide (page 3, lines 58–63), which does not, however, remove the gas that is soluble in the treated product (page 3, lines 61–63), and thereafter there is no further heating to remove oxygen. Michaud, French Pat. No. 679,991, discloses (page 2, lines 29–97) air exchange, without any recognition of achieving the critical degree of less than 3 ppm. Van Olphen, U.S. Pat. No. 3,409,446, is directed to pasteurization and evaporation of egg products. A period of 20 minutes is suggested for the pasteurization (column 2, line 18), only for the purpose of killing bacteria and not as a deoxygenation step. Heuser, U.S. Pat. Nos. 1,900,444 and 1,989,359, attempts the removal of air from an egg mixture by subjecting the egg mixture to centrifugal force, which apparently removes some of the oxygen. Fousek, U.S. Pat. No. 1,756,189, discloses the heating of a sugared egg mixture. The applicant's French Pat. No. 2,276,787, also discloses a sugar-salted egg mixture combined, however, with a micro-organism destructing agent.

SUMMARY OF THE INVENTION

The invention provides a new product which, in relation to analogous products having the same proportions of salt and/or sugar, has a clearly lesser content of dissolved oxygen, and above all a very small number of germs. This gives remarkable bacteriological stability and great safety for varied uses, even in certain cases, if the product is returned to open air for several weeks before consumption.

Liquid egg products are preserved for long periods of time, at low cost, by controlled and sufficient deoxygenation of the liquid egg product. A sterilized egg product of the invention is capable of a shelf life of 6 to 8 months after treatment. The product can be concentrated or unconcentrated, salted or sugared, or both salted and sugared; the introduction of ingredients can be done before, during or after the deoxygenation; subsequently, the deoxygenated egg product is heated in a closed container or under a stream of inert gas to a temperature less than its coagulation temperature and for an appropriate time interval, and then the egg product is maintained in an air tight container, in a vacuum or in the presence of an inert gas.

There is thus obtained a liquid egg product of prolonged preservation, with practically no alteration of proteins and whose preservation can be prolonged several months without alteration of the organoleptic properties of the product, or of the technological or physical qualities such as the emulsifying or swelling characteristics.

In a first aspect of the invention, there is provided a salt- or sugar-containing raw egg product designed for maintenance at room temperature prior to inclusion in a recipe. In this embodiment, the improvement comprises inclusion in the raw egg product:

(a) sufficient salt, sugar or mixture thereof to provide an osmotic pressure of at least 20 atm;

(b) the removal of substantially all oxygen which could lead to recognizable spoilage or deterioration when the raw egg product is stored at room temperature for a prolonged period of time; the removal comprises the treatment of the egg product to a deoxygenation temperature which avoids coagulation and deterioration of protein contained in the egg product, whereby the total amount of oxygen that results is less than about 3 ppm;

(c) subjecting the deoxygenated and salted- or sugared-egg product mixture to a temperature below the coagulation and protein-deteriorating temperature for a period sufficient to substantially destroy any bacterial contaminants; and (d) maintaining the resultant product at conditions to maintain the oxygen level below about 3 ppm and to avoid bacterial contamination.

Preferably, the oxygen content is not more than about 1 ppm. Step (a) may occur subsequent to step (b). In a preferred embodiment, step (c) is maintained for at least 24 hours.

In a further aspect of the invention, there is provided a process for manufacture of a salted or sugared uncooked egg mixture capable of prolonged shelf life which comprises whole or separated egg which is substantially devoid of sufficient oxygen whereby there is avoided recognizable spoilage or deterioration that would result in any noticeable change in appearance that could otherwise occur during a prolonged period under conditions of room temperature, which comprises:

(a) mixing uncooked egg and sufficient salt or sugar to form an egg mixture having an osmotic pressure of at least 20 atm;

(b) removing substantially all oxygen by treating the uncooked egg mixture to a deoxygenation temperature which avoids coagulation and deterioration of protein contained in the egg mixture, whereby the total amount of oxygen that results is less than about 3 ppm;

(c) subjecting the deoxygenated, salted or sugared uncooked egg mixture to a temperature below the coagulation and protein-deteriorating temperature for an extended period; and (d) storing the egg mixture under conditions which maintain a level of not more than 3 ppm oxygen and avoid bacterial contamination.

In a further aspect of the invention, there is provided a salter- or sugared-raw egg mixture capable of prolonged shelf life which comprises whole or separated egg which is substantially devoid of sufficient oxygen whereby there is avoided recognizable spoilage or deterioration that would result in any noticeable change in appearance that could otherwise occur during a prolonged period under conditions of room temperature. The mixture comprises an uncooked mixture of egg and either salt or sugar; and has an osmotic pressure of at least 20 atm and not more than 3 ppm oxygen.

In a preferred embodiment, the salted- or sugared-raw egg mixture capable of prolonged shelf life comprises an uncooked mixture having sufficient salt, sugar, or a mixture thereof to provide an osmotic pressure of at least 20 atm and has not more than 3 ppm oxygen, which is produced by the removal of substantially all oxygen which could lead to recognizable spoilage or deterioration when the raw egg product is stored at room temperature for a prolonged period of time; the removal comprises the treatment of the egg product to a deoxygenation temperature which avoids coagulation and deterioration of protein contained in the egg product, whereby the total amount of oxygen that results is less than about 3 ppm; and the raw egg product is maintained at conditions to maintain the oxygen level below about 3 ppm and to avoid bacterial contamination.

In a further aspect of the invention, there is provided a salt- or sugar-containing raw egg product designed for maintenance at room temperature prior to inclusion in a recipe. In this embodiment, improvement comprises inclusion in the raw egg product of:

(a) sufficient salt, sugar or mixture thereof to provide an osmotic pressure of at least 20 atm;

(b) the removal of substantially all oxygen which could lead to recognizable spoilage or deterioration when the raw egg product is stored at room temperature for a prolonged period of time; the removal comprises bubbling nitrogen through the raw egg product to achieve an oxygen content in the raw egg product of less than about 3 ppm;

(c) subjecting the deoxygenated and salted- or sugared-egg product mixture to a temperature below the coagulation and protein-deteriorating temperature for a period sufficient to substantially destroy any bacterial contaminants; and (d) maintaining the resultant product at conditions to maintain the oxygen level below about 3 ppm and to avoid bacterial contamination.

In a further aspect of the invention, there is provided a salt- or sugar-containing raw egg product designed for maintenance at room temperature prior to inclusion in a recipe. In this embodiment, the improvement comprises inclusion in the raw egg product of:

(a) sufficient salt, sugar or mixture thereof to provide an osmotic pressure of at least 20 atm;

(b) the removal of substantially all oxygen which could lead to recognizable spoilage or deterioration when the raw egg product is stored at room temperature for a prolonged period of time; the removal comprises placing the raw egg product in a chamber, creating a vacuum of less than 80 tores in the chamber, regulating the oxygen content until said oxygen content is less than about 3 ppm;

(c) subjecting the deoxygenated and salted- or sugared-egg product mixture to a temperature below the coagulation and protein-deteriorating temperature for a period sufficient to substantially destroy any bacterial contaminants; and (d) maintaining the resultant product at conditions to maintain the oxygen level below about 3 ppm and to avoid bacterial contamination.

DETAILED DESCRIPTION OF THE INVENION

The initial liquid egg product is the whole egg, egg yolks or egg whites coming directly from the breaking of hen eggs and whose dissolved oxygen content at the end of several hours after breaking of the eggs is in the order of 5 to 10 ppm (parts per million). This oxygenation results from the treatment (breaking) of the eggs, which is carried out at least in part in open air; while in its shell, the egg contains on the average 3.4 ppm of dissolved oxygen, 2 to 3 days after collecting it.

According to the process of the invention:

(a) one adds in a homogeneous fashion to the initial liquid egg product, concentrated or not, salt in a quantity of at least 5% by weight in relation to the weight of the final product, or sugar in a quantity of at least 30% and preferably 35% by weight in relation to the weight of the final products, or salt and sugar at the same time until the product has an osmotic weight or pressure of 20 and preferably 25 atmospheres.

(b) one removes the dissolved gas from the product until obtaining an oxygen content less than 3 ppm and preferably less than 1 ppm in relation to the weight of the final egg product, stages (a) and (b) can be carried out in any order whatever;

(c) one eventually carries out a thermal treatment of the product obtained after stages (a) and (b), to a temperature less than the coagulation temperature of the product; and (d) one ultimately places the product into an air tight container under a high vacuum or in the presence of a neutral feed gas other than carbon dioxide, the temperature never exceeding the coagulation temperature of the egg product in the course of the treatment.

In stage (a) of the process one introduces salt and sugar as well as eventually the other usual additives such as benzoates or colorants like carotene.

By "sugar" is meant sucrose (saccharose, cane sugar), galactose and analogeous sugars, preferably unfermentable sugars having a comparable osmotic weight.

The deoxygenation can be carried out either by entrainment with a feed gas or by heating to a temperature of 45° to 75° C. for a short period of time, and determined according to the nature of the egg product treated, or, in addition, by the combination of the two processes with an eventual reduction of pressure. One always chooses the temperature and the duration of heating in a way so as to avoid the deterioration and/or the coagulation of the egg, especially when one operates in a partial vacuum. Besides, when one uses a concentrated product as a starting product, the concentration can be made by any means with the reservation that, in the case of a thermal treatment, the conditions mentioned above be respected, and the temperature must not exceed preferably about 50° C. at atmospheric pressure for a time period less than 6 hours.

When the initial egg product is egg whites to which only salt is added, the salt must be present in a quantity of at least 5% by weight in relation to the weight of the final product, and when only sugar is added, the sugar must be present in a quantity of at least 30% and preferably 35% by weight in relation to the final product.

When the initial egg product is egg yolks to which only salt is added, the salt must be present in a quantity of at least 5% and preferably 7% by weight in relation to the final product; when only sugar is added, the sugar must be present in a quantity of at least 35% and preferably 40% by weight in relation to the final product.

When the initial product is the whole egg, it is preferable to adopt proportions near those used for egg whites.

In the case where the egg product contains both salt and sugar, the salt should be present preferably in a quantity of at least 0.5% by weight and the sugar preferably in a quantity of at least 25% by weight in relation to the weight of the final product, the osmotic pressure of weight being at least 20 atm. and preferably 25 atm. Salt, sugar or both salt and sugar, can be introduced at any time whatever during the treatment, and the egg product can be concentrated, before, during or after the gas removal treatment.

The degassing can be done in different ways, on the unconcentrated liquid egg product, or on the already concentrated liquid egg product, in a continuous or discontinuous manner, by using a gas for drawing away oxygen with or without recycling, or by submitting the egg product to a sufficient vacuum or to a sufficient heating, these various processes being able in addition to be combined; $O_2$ and $CO_2$ are purged in a known fashion if there is recycling. When one uses an unconcentrated liquid egg product, one carries out the gas removal either directly on the initial liquid product, or after having incorporated additives into it, that is to say, the salt of sodium chloride and/or sugar, on the whole being perfectly homogenized. Although the introduction of additives and the gas removal can be carried out in any order whatever, one preferably first adds the additives to the liquid egg product, and after mixing to obtain a homogenous mixture, one proceeds to the operation of gas removal by controlling the content of dissolved oxygen until obtaining the limit of deoxygenation desired.

When one desires to obtain a final concentrated product, it is preferable to first of all carry out the concentration, for example, by ultrafiltration, and then one degasses before or after the introduction of additives.

The elimination of dissolved gas can be carried out by simply bubbling an inert feed gas preferably other than carbon dioxide through the liquid egg product. One can likewise create the vacuum in the chamber containing the liquid egg product, then eventually break the vacuum with an inert gas and repeat this operation until the formation of foam on the surface of the product stops, always controlling the content of dissolved oxygen. In general, one uses a vacuum less than 80 and preferably 40 to 60 tores. According to a preferred variation, one makes the inert gas bubble in an adjustable (regulatable) fashion in the liquid egg product and one maintains an adjustable vacuum in the atmosphere above the liquid egg product, in such a way that one can begin the bubbling at atmospheric pressure and reduce the pressure progressively while diminishing the admission of inert gas until eventually obtaining at the end of the operation a vacuum chosen according to the osmotic weight of the product and the temperature at the end of the treatment.

For this purpose one can use volumetric pumps able to function at relatively low pressures; the liquid egg is sprayed in a chamber under controlled vacuum and drawn off continuously from the lower part of this chamber to be conducted then into one or some containers and to be preserved there protected from the air.

It is likewise advantageous in the case where one desires to obtain a final product both concentrated and deoxygenized to connect an ultrafiltration device and degassing device in the same installation continuously.

The inert feed gas can be nitrogen, nitrous oxide, rare gases such as argon, freon 114 (chloro-1 pentafluoro-1,1,2,2 ethane) or similar freons.

In the case where the degassing is accomplished by simple heating, it is done in an open vat in open air, in a closed vat, or under a flow of neutral gas such as the gases mentioned above, with or without agitation of the medium. The egg product is heated to a temperature in the range of 45° to 75° C., and preferably 50° to 60° C., for a period of time less than that which causes coagulation or the deterioration of the proteins and of the fatty materials while monitoring or testing the content of oxygen until is is less than 3 ppm.

Thus, for pure egg, the maximum temperature of the treatment is 50° for less than 6 hours. For an egg product concentrated and sugared to 50% by weight, the maximum temperature is 75° C. for less than 4 hours. However, one obtains good results with heating periods of several dozen minutes to several hours.

One then immediately stops the heating and lets the product cool down, or cools it in a heat exchanger.

In the case of delicate products, one can advantageously obtain the deoxygenation both by driving off the oxygen with a neutral gas and by heating, especially in the treatment of pure egg whites to which additives, such as salt or sugar, are previously introduced.

It is likewise advantageous to carry out the deoxygenation, especially in the case of deoxygenation by simple heating, with a tubular installation in which the egg product circulates, the temperature variations being obtained easily by a jacket with a heating or cooling fluid whose circulation is regulated as desired.

When the liquid egg product is concentrated, the concentration of the initial product or of the deoxygenized product can be carried out preferably until one obtains an extract with removed moisture not exceeding 60% by weight.

Whatever the process of deoxygenation used, it is necessary to obtain an oxygen content not exceeding 3 ppm in the absence of any coagulation or deterioration of proteins of the egg product, but the content can be less according to the quality desired for the final product.

At the end of stages (a) and (b) of the treatment, the deoxygenized liquid egg product is preserved protected from the air, preferably in a neutral atmosphere for its use in stage (c) of the process or of its packaging for consumption.

Stage (c) of the process of the invention consists of heating the deoxygenized liquid egg product to a temperature less than the coagulation temperature and being able to attain 75° C. for a time period of 4 hours or several days at a temperature of 50° to 65° C., in a closed container or under a circulation of a neutral gas, such as those already mentioned. The treatment is always carried out in such way to avoid the deterioration of the proteins and of the fatty materials, as well as coagulation.

In accordance with the invention one obtains an excellent preservation of the egg product, going as far as "sterilization", while easily avoiding the deterioration of the proteins of the egg product. By "sterilization", is meant that on obtains a product containing less than 1000 germs of microorganisms per gram.

In particular and contrary to the case of certain poorly sterilized preserved food, one does not observe, during heating the egg product obtained after stages (a) and (b), enzymatic reactions harmful to the good preservation of the product. Rather, after holding at temperatures of 45° to 65° C., the products of the invention become absolutely sterile in a period of time going from several hours to several days.

It is probable that the treatment of the invention causes, by heating at stage (c) an acceleration of the phenomena of autosterilization of the liquid egg; the very small proportion of oxygen and of residual carbon dioxide and the increase of the osmotic weight or pressure with temperature favor and accelerate the enzymatic bactericidal reactions of certain proteins of the egg.

The heating can carried out in stage (c) of the process of the invention, either in conventional closed vats, under atmosphere or under circulation of neutral gas, or in tubular installation, or by heating the product obtained at the end of the stages (a) and (b) and placing it directly in its final hermetically sealed package, for marketing.

According to one variation, it is advantageous for certain products to be cooled rapidly after the thermal treatment of stage (c) by a rapid cooling, which is easily accomplished in the tubular installations or when the product is packaged at the end of the stages (a) and (b).

The parameters relative to the temperature and the duration of stage (c) are determined for each of the egg products obtained at the end of stages (a) and (b) and of which one knows the concentration, the content of additives and the content in ppm of oxygen as well as the degree of initial biological purity, with the aid of previously established tables and charts.

One can thus obtain a sterilized liquid egg product according to the invention and in which the number of microorganism germs per gram can be less than 1,000 according to requirements.

The product can be finally hermetically packaged at the end of stages (a) and (b) of the process, or else stored at ambient temperature, still under neutral atmosphere in view of the treatment according to stage (c). Then the heating can be done on the packaged or unpackaged product. In this last case, the final hermetic packaging is done at the end of the heating and the product is stored in this form at ambient temperature.

The various stages of the process of the invention can be carried out continuously or with interruption between the stages.

However, stages (a) and (b), whatever be the way in which they are carried out, comprise essentially the controlled elimination of oxygen to a content not exceeding 3 ppm, without deterioration of proteins and of fatty materials, even in the heating stage (c) when it is carried out. In this last case the oxygen content can even be controlled at the end of stage (c).

The conditions for this deterioration are well known as, for example, treatment at too high a temperature or too great an addition of salt of or sugar.

The analytic and organolytic qualities of the finished products, which are tested for each of their uses, serve also to establish tables and graphs permitting determination of the conditions of temperature and duration of stage (c) of the process according to the discharged product and stages (a) and (b).

The process of the invention permits maximum avoidance of the deterioration of proteins such as lysozyme, ovotransferrin, ovomucoid, ovomucin, and ovoinhibitors originally contained in the egg and which have a direct or indirect action on the survival and multiplication of microorganisms and the blocking of microbial enzymes. It is then of greatest interest that they stay as unaltered as possible, as is the case in the egg product of the invention.

The process comprises then stages (a) and (b) in which one obtains the relatively rapid and controlled reduction in the oxygen content of the egg product to less than 3 ppm, and preferably less than 1 ppm, and eventually stage (c) constituted by a prolonged thermal treatment, these stages being carried out under conditions avoiding the deterioration of the proteins and of the fatty materials.

The invention has also as an object the liquid egg product obtained after stages (a) and (b) and which, placed immediately in a vacuum or in an inert atmosphere (other than carbon dioxide), contains less than 3 and preferably less than 1 ppm of oxygen, after 15 days at 20° C., less than 15,000 and preferably less than 1,500 germs per gram. This product can be stocked or stored for several months while maintaining excellent organoleptic properties; it can be used in a fashion completely analogous to that of corresponding fresh products, and even present an improvement, in certain cases, such as the good preservation of a whipped product.

It is a matter of, in fact, a new product which, in relation to corresponding analogous products having the same proportions of salt and/or of sugar, have a clearly small dissolved oxygen content.

It has been verified, for example, that collected eggs treated according to the process of the invention would present new and improved characteristics even in relation to egg whites coming from freshly lain unbroken eggs for which the dissolved oxygen content is on the average 3.4 ppm, and the pH on the average of 9 to 9.2 for 2 to 3 days old eggs.

The final egg product at the time of packaging has an oxygen content less than 3 ppm and preferably 1 ppm.

When dealing with a product with egg white base, it contains either at least 9% by weight salt, or at least 45% sugar, or both salt and sugar with an osmotic pressure at least equal to 20 atm, the pH being from 8.60 to 8.85.

When dealing with a product with egg yolk base, it contains either at least 5% by weight salt, or at least 40% sugar, or both salt and sugar with an osmotic pressure at least equal to 20 atm, the pH being from 6.30 to 6.45. When dealing with a product with whole egg base or reconstituted in variable proportions, it comprises either at least 5% and preferably 9% salt, or at least 40% and preferably 45% sugar, or both salt and sugar with an osmotic pressure at least equal to 20 atm, the pH being from 6.30 to 8.85.

The invention has likewise as an object the liquid egg product obtained after stage (c) and which, placed immediately in a vacuum or in an inert atmosphere other than an atmosphere of carbon dioxide, comprises less than 5,000 and preferably less than 1,000 germs per gram at the time of storing, and whose proteins or fatty materials have no deterioration. This product can be stored for several months while preserving all its organoleptic properties and can be used in a manner analogous to that of corresponding fresh products.

The invention deals with a new product which, in relation to analogous products having the same proportions of salt and/or sugar, has a clearly lesser content of dissolved oxygen, and above all a very small number of germs, which gives it a remarkable bacteriological stability and great safety for very varied uses, even in certain cases if the product is returned to open air for several weeks before comsumption. Of course, this stability is more or less prolonged according to the osmotic weight of the product, the preservation of the sterilized egg product of the invention being able to attain 6 to 8 months after treatment, as far as stage (c).

When the product of the invention is a product with egg white base, it comprises either at least 5% and preferably 7% by weight salt, or at least 30% and preferably 35% sugar, or salt and sugar with an osmotic pressure at least equal to 20 atm, less than 3 and preferably less than 1 ppm of oxygen, and a number of germs per gram less than 5,000 and preferably less than 1,000 germs per gram.

When the product of the invention is a product with egg yolk base, it comprises either at least 5% and preferably 7% by weight salt, or at least 35% and preferably 40% sugar, or both salt and sugar with an osmotic pressure at least equal to 20 atm, less than 3 and preferably less than 1 ppm of oxygen, and a number of germs per gram less than 2,000 and preferably less than 500.

When the product of the invention is a product with a base of whole eggs or eggs reconstituted in variable proportions, it comprises either at least 5% salt, or at least 30% and preferably 35% sugar, or both salt and sugar with an osmotic pressure at least equal to 20 atm, less than 3 and preferably less than 1 ppm of oxygen, and a number of germs per gram less than 2,000 and preferably less than 500.

In relation to the degassed egg product obtained after stages (a) and (b) of the process, the egg product obtained after heating according to stage (c) has the advantage, for a same duration of preservation, of eventually having a smaller osmotic weight, that is to say to comprise lesser proportions of ingredients such as salt and sugar, which is wanted for certain uses.

Moreover, when the broken eggs have a high germ count, it can be advantageous, without increasing the osmotic weight of the product, to supplement stages (a) and (b) of the process by the heating stage (c) and to thus assure a better preservation of the product.

Of course, the process of the invention concerns the prolonged preservation of liquid egg products coming from all types of eggs usable for human consumption or in any other application.

One has ascertained that the products of the invention have in relation to similar liquid egg products, improved properties concerning the beating or whipping especially in meringues and frostings, good coagulation of proteins in pastry especially for angel food cake, and emulsifying properties especially for mayonnaise. In particular, the egg products of the invention give much better results than the pasturized egg products of the prior art, as far as beating is concerned.

The following nonlimiting examples in which one has used ordinary "collected" hen eggs, will permit a better understanding of the objects of the invention. One means by "collected" eggs, eggs having been laid 8 to 30 days before being broken and treated. Except when mentioned to the contrary, the percentages of the ingredients always mean by weight in relation to final product and the temperature are in degree centigrade.

EXAMPLE A

One prepares a sample of 200 g of liquid egg yolks well mixed, being a 43% dry (i.e. 43% dehydrated, base on the initial weight), a pH of 6.54 and containing 190,000 germs per gram. One selects 100 g constituting a sample $A_1$ and keeps it at 20° C. in a hermetically closed chamber under a nitrogen atmosphere, after having taken 10 g of product to analyze the dissolved oxygen.

To a 50 g sample $A_2$ of egg yolks taken from the same initial mixture, 48 g of sugar and 2 g of salt, are added, and the sample is homogenized. The sample is placed in a closed chamber in which a vacuum up to 50 mm Hg is created by using a P.PIEL MARC 702 pump and this vacuum is maintained for 15 seconds. The vacuum is interrupted by introducing nitrogen and one repeats the operation until foam no longer forms on the surface of the product. All the above mentioned operations are carried out at ambient temperature.

A 10 g sampled of the mixture is set aside for the analysis of the dissolved oxygen. The remainder of the product is maintained under the same conditions as sample $A_1$.

The oxygen analyses are carried out immediately for $A_1$ and $A_2$ with the aid of a dissolved oxygen analyser YSI 54 (Yellow Spring Instrument, Yellow Springs Ohio 45387 USA). After 1 month the total flora in sample $A_2$ is determined.

The results are the following:

|  | Dissolved oxygen | Total flora |
|---|---|---|
| Sample $A_1$ | 8.7 ppm | determination impossible (sample destroyed) |
| Sample $A_2$ | 2.7 ppm | 1,600 germs/g |

Similar results are obtained by operating in the same manner as above but without interrupting the vacuum to the extent that the formation of foam is avoided. Preferably, the treatment is completed by a vacuum of several mm Hg for more than 10 minutes.

EXAMPLE B

One carries out a series of tests of preservation of liquid egg yolks beginning with 10 kg of liquid egg yolks B completely mixed, of which one takes 200 g for each of the tests, for the preparation of the egg product according to the invention, and of which the initial characteristics are the following:
Dry extract: 47% (solid content by weight)
pH: 6.58

Viscosity: 440 centipoises (C.P.) measured with the DRAGE viscosimeter, PROLABO type modulus 4 or 3.

Dissolved $O_2$: 7 ppm (measures as indicated in example A)

$CO_2$ removed: 1.5 millimole per milliliter (measured with a "$CO_2$ apparatus SET" manufactured by HARLECO HERSTAL)

Total flora: 980 germs per gram or (germs/g)

One completes each of 200 g sample by adding quantities of salt (sodium chloride of alimentary quality), sugar (sucrose), or both salt and sucrose as indicated in percentage by weight in Table I. After complete homogenization at a temperature of 20° C. in a spherical or round bottomed agitator flask, each time one takes 150 g of mixture and places it in another spherical flask furnished with a tube for the introduction of gas, and with a thermometer. In each test, the temperature is regulated at 20° C. by a water bath, and nitrogen is bubbled through the product for 10 seconds at a flow of 3 liters per minute. At the end of each test as indicated above one measures the viscosity, the pH, the quantity of dissolved oxygen, the carbon dioxide released, and determines the osmotic pressure and the corresponding dry extract weight.

One takes 100 g of each product obtained after bubbling the nitrogen and places them in a hermetically sealed chamber, at a temperature of 20° C. After 15 days the total flora for each sample is determined.

Sample $B_1$, containing neither salt nor sugar, is ruined at the end of 5 days, but samples $B_2$ through $B_8$ containing respectively 5% to 15% of salt are completely preserved.

As for the samples containing sugar only, only samples $B_{12}$ through $B_{15}$, that contain more than 40% of sugar have good preservation.

As for samples containing both salt and sugar one ascertains that it is perferable that the salt content be at least 0.5% and the sugar content at least 47.5% which corresponds to samples $B_{19}$, $B_{20}$, and $B_{21}$. The above tests permit determining the lower limits for the percentages of salt and of sugar when the dissolved oxygen content is in the order of 2 to 2.3 ppm. But it would be interesting to know if the acceptable limit could be greater. This limit has been researched for a product with liquid egg yolk base prepared under the conditions of Table I and containing 47.5% sugar, but with samples for which the duration of nitrogen bubbling varied from 0 (before bubbling) to 10 seconds. Tests $B_{24}$ and $B_{25}$ show that the upper acceptable limit for residual oxygen dissolved in liquid egg yolk treated according to the process of the invention is on the order of 2 to 3 ppm. All the above tests are carried out at ambient temperature.

One obtains analogous results by degassing first before the introduction of salt and/or sugar, but in this case it is necessary to terminate the treatment by complimentary degassing by controlling the dissolved oxygen contents as indicated above.

EXAMPLE C

One carries out a series of tests of preservation of liquid egg whites beginning with 10 Kg of essentially unconcentrated liquid egg whites, completely mixed, of which one takes for each of the tests, 200 g for preparation of the egg product according to the invention, and whose initial characteristics are the following:

Dry extract: 12% by weight pH: 9.2

Viscosity: 5 cp (PROLABO viscosimeter modulus 2)

Dissolved oxygen: 10 ppm $CO_2$ releasing: 39 millimoles per millimeter

Total flora: 12,500 germs/g

All the measurements are carried out as in Example B and one proceeds exactly as in Example B.

The results are indicated in Table II.

One ascertains that sample $C_1$ containing neither salt nor sugar has a flora greater than 100,000,000 germs/g after 15 days at 20° C. In the samples containing only salt, it is preferable that the proportion of salt be at least equal to 9% by weight as indicated in test $C_4$ having a flora of 5,000 germs/g. As for the samples containing only sugar, it is preferable that the proportion of sugar be at least equal to about 40% by weight according to $C_{12}$. As for the samples containing both salt and sugar, it is necessary that the proportion of salt be at least 0.5% by weight and the proportion of sugar be at least 47.5% by weight according to $C_{19}$.

As in Example B, the upper acceptable limit for residual dissolved oxygen in the liquid egg whites treated according to the process of the invention is again on the order of 2 to 2.5 ppm as indicated by samples $C_{24}$ and $C_{25}$.

In Examples A, B, and C one can use with good results argon, nitrous oxide, freon 114 or freon 115, as the gas, with a treatment temperature less than 50° C. and preferably 10° to 35° C.

One obtains analogous good results with concentrated egg products up to a percentage of dry extract not exceeding 60%, both for egg yolks, egg whites and whole eggs, the proportions of salt or of sugar remaining in other respects unchanged.

EXAMPLE D

One prepares 400 g of concentrated whole egg of 48% dry extract. A 50 g sample $D_1$ is taken and preserved at 20° C. in a hermetically sealed chamber under a nitrogen atmosphere, after having taken 10 g of product for analysis of the dissolved oxygen.

To a 200 g sample of initial concentrate whole egg mixture is added 200 g of sucrose, and after having mixed it all well, one takes samples $D_2$ and $D_3$ of 100 g each.

Sample $D_2$ is heated in a water bath for 15 minutes at 50° C. and sample $D_3$ for 15 minutes at 65° C., then the treated samples are allowed to cool.

One determines as in Example A the oxygen content as well as the number of germs per gram of the samples preserved for 15 days at a temperature of 20° C. and then kept for 72 hours at a temperature of 30° C. The results are the following:

|  | Dissolved oxygen in ppm | Number of germs per g |
| --- | --- | --- |
| Sample $D_1$ | 4 | Sample destroyed |
| Sample $D_2$ | 1.5 | 900 |
| Sample $D_3$ | 0.3 | 150 |

One obtains analogous results with whole egg regardless of the percentage of dry extract.

EXAMPLE E

One carries out a series of tests of preservation of liquid egg white beginning with 20 kg of unconcentrated liquid egg white, completely mixed, of 11% dry extract by weight.

One takes a 100/g sample $E_1$ and maintains it at 20° C. in a hermetically sealed chamber under a nitrogen atmosphere, after having taken 10 g of product for analysis of the dissolved oxygen.

One then takes a sample $E_2$ of 100 g, a sample $E_3$ of 90 g, and a sample $E_4$ of 50 g to each of which one adds 50 g of sucrose and which one mixes completely.

One heats samples $E_2$, $E_3$ and $E_4$ in a water bath at a temperature of 50° C. for 20 minutes and one stops the heating. One adds to sample $E_3$ 10 g of salt that one mixes completely with the egg white.

One immediately takes 10 g for analysis of oxygen content and places the remainder of each sample in a hermetically sealed chamber at a temperature of 20° C. The total flora was determined, as in the proceeding examples, after 15 days.

The following results were obtained:

|  | Dissolved oxygen in ppm | Number of germs per g |
|---|---|---|
| Sample $E_1$ | 7 | 6,000,000 |
| Sample $E_2$ | 2 | 4,500,000 |
| Sample $E_3$ | 1.5 | 1,200 |
| Sample $E_4$ | 1.3 | 950 |

EXAMPLE F

One carries out a series of tests of preservation of liquid egg yolks, beginning with egg yolks already subjected to deoxygenation according to stages (a) and (b) of the process of the invention, and that one submits to a prolonged heating treatment according to stage (c) of the process.

One carries out test $F_1$ beginning with 10 kg of liquid egg yolks completely mixed, of 44% dry extract by weight, and having 380,000 germs of micro-organisms per gram.

To 200 g of egg yolks one adds 200 g of sugar while agitating until obtaining a completely homogenous mixture. One then degasses as in Example B. The oxygen content measured at the end of the deoxygenation, that is to say, at the end of stages (a) and (b), is 2.9 ppm. The sample is heated at a temperature of 65° C. for 72 hours under a flow of nitrogen and obtains an egg product whose characteristics are the following:

Dry extract: 72.0%

Dissolved oxygen: 0.5 ppm (measured as indicated in Example A)

Number of germs per gram: less than 10

The product is not coagulated and the proteins that it contains have practically no deterioration.

One proceeds in the same manner for test $F_2$, $F_3$ and $F_4$, which are all done with egg yolks of 44% dry extract, but for which the conditions of treatment have been modified as indicated in Table II.

This table places in evidence the improvement brought about by the heating stage (c) to the products having already been submitted to the deoxidation according to stages (a) and (b).

The final egg product particularly has a dissolved oxygen content less than 1 ppm and a number of germs per gram less than 500 and usually less than 100.

One obtains these good results at the end of stage (c), when stages (a) and (b) are carried out in any order whatever, and where the deoxidation is obtained either by creating a vacuum on the order of 80 tores or by simple heating until the oxygen content is less than 3 ppm as in examples E and D, the thermal treatment according to stage (c) being then carried out as in examples $F_1$ through $F_4$.

EXAMPLE G

One carries out series of tests of preservation of liquid egg whites, beginning with egg whites deoxygenated according to stages (a) and (b) of the process of the invention and subjected to prolonged heating according to stage (c) of the process.

One carries out the test $G_1$ and $G_2$ beginning with 10 kgs of concentrated liquid egg whites completely mixed, of a 33% dry extract by weight, having 99,000 germs of microorganisms per gram, before concentration to obtaining the 33% dry extract. One prepares 200 g of mixture $G_1$ and $G_2$ containing respectively either 11% of sodium chloride or 50% of sugar, and one carries out the deoxygenation as indicated in Example B. The oxygen content measured at the end of the deoxygenation is respectively 2.7 and 2.5 ppm for test $G_1$ and $G_2$. One then heats the two samples respectively at temperatures of 50° and 65° C. for 24 hours, and obtains a final product whose characteristics are indicated in Table III.

One proceeds in the same manner for test $G_3$, $G_4$ and $G_5$, but beginning with egg whites having 90,000 germs of microorganisms per gram.

Table III specifies the particular conditions of these tests, especially the salt or sugar content, temperature and duration of stage (c), and it likewise specifies the oxygen content and the number of germs in the final product.

Here again, good results are obtained when the deoxygenation stage is carried out in a partial vacuum of by simple heating.

EXAMPLE H

One carries out a series of tests of preservation of whole eggs beginning with concentrated whole eggs having undergone deoxygenation according to stages (a) and (b) of the process of the invention and which one submits to the prolonged heating according to stage (c) of the process.

One carries out test $H_1$ to $H_4$ each time beginning with 10 kg whole eggs completely mixed, concentrated to a 48% dry extract, but whose number of germs of microorganisms is different, as indicated in Table III. The tests are carried out on quantities of 200 g of respective mixtures as indicated in Table III and the deoxygenation is done as in Example B. Table III indicates in addition, for each test, the conditions of prolonged heating according to stage (c) as well as the characteristics of the products obtained at the end of the deoxygenation, and those of the final product.

Here again, one obtains analogous results for the final product since the deoxygenation is carried out in a partial vacuum or by simple heating as in Examples D and E.

Example $H_5$, one heats while agitating, 1,000 kg of a mixture comprising 665 kg of whole eggs concentrated to a 48% dry extract, 330 kg of sugar and 5 kg of salt, at a temperature of 55° C. for 72 hours, in a closed vat having a nitrogen sweep. The initial number of germs of the whole egg, before concentration, was 950,000 germs per gram.

There was no further checking of deoxygenation result at the end of stages (a) and (b). One obtains a final egg product comprising 260 germs per gram and whose oxygen content is 0.9 ppm.

At the end of the treatment the product is put in individual packages each with 200 g of product, always under nitrogen atmosphere, these packages being hermetically closed and stored. A test carried out after 11 days of storing at ambient temperature indicates an average content of 100 germs per gram in the egg product.

For whole egg products, just as for products of egg yolks and egg whites, one obtains analogous results when one carries out the deoxidation in a partial vacuum or by simple heating as in the case of example $H_5$.

In general, it has been observed in addition that the preservation of the products of Examples F, G and H at a temperature of 50° C. for several months would have as a result a tendency to diminish the number germs of microorganisms, which is of considerable interest for certain countries, especially for countries with tropical climates.

Completely comparable results have been obtained by treating egg products concentrated up to 60% dry extract in a manner analogous to that of Example H.

TABLE I (egg yolks)

| N° $B_1$ to $B_{25}$ | Ingredients NaCl % by weight | Ingredients Sugar % by weight | Duration of bubbling in seconds | Osmotic pressure in atmosphere | Viscosity in centipoise | Dry extract % by weight | pH | Dissolved gas $O_2$ ppm | Dissolved gas $CO_2$ millimole | AEROBIC MESOPHILE FLORA in number of germs (per gram after 72 hours at 30° C. on samples preserved 15 days at 20° C.) |
|---|---|---|---|---|---|---|---|---|---|---|
| 1 | 0 | 0 | 10 | 0 | 440 | 47 | 6.58 | 2.5 | 1 | Sample spoiled after 5 days |
| 2 | 5 | 0 | 10 | 38.3 | 1.450 | 49.6 | 6.38 | 2.3 | 1 | 350 |
| 3 | 7.5 | 0 | 10 | 57.5 | 2.800 | 51 | 6.36 | 2.3 | 1 | 50 |
| 4 | 9 | 0 | 10 | 69 | 4.750 | 51.8 | 6.32 | 2.2 | 1 | 50 |
| 5 | 10 | 0 | 10 | 77 | 6.000 | 52.3 | 6.30 | 2.3 | 1 | 50 |
| 6 | 11 | 0 | 10 | 84.3 | 8.300 | 52.8 | 6.27 | 2.3 | 1 | 30 |
| 7 | 12 | 0 | 10 | 92 | 10.000 | 53.4 | 6.25 | 2.2 | 1 | — |
| 8 | 15 | 0 | 10 | 115 | 22.600 | 55 | 6.25 | 2.1 | 1 | — |
| 9 | 0 | 10 | 10 | 6.5 | 200 | 52.3 | 6.54 | 2.2 | 1 | 86,000,000 |
| 10 | 0 | 20 | 10 | 13 | 300 | 57.6 | 6.52 | 2.3 | 1 | 26,250,000 |
| 11 | 0 | 30 | 10 | 19.6 | 500 | 62.9 | 6.49 | 2.1 | 1 | 13,200,000 |
| 12 | 0 | 40 | 10 | 26 | 620 | 68.2 | 6.45 | 2.2 | 1 | 1,550 |
| 13 | 0 | 45 | 10 | 29.4 | 800 | 70.8 | 6.47 | 2.2 | 1 | 570 |
| 14 | 0 | 47.5 | 10 | 31 | 900 | 72.1 | 6.44 | 2.3 | 1 | 300 |
| 15 | 0 | 50 | 10 | 32.6 | 3.500 | 73.5 | 6.62 | 2.1 | 1 | 40 |
| 16 | 0.5 | 45 | 10 | 33.2 | 800 | 71.1 | 6.40 | 2.1 | 1 | 540 |
| 17 | 1 | 45 | 10 | 37.1 | 900 | 71.3 | 6.35 | 2.2 | 1 | 1,820 |
| 18 | 2 | 45 | 10 | 44.8 | 800 | 72 | 6.33 | 2 | 1 | 5,600 |
| 19 | 0.5 | 47.5 | 10 | 34.8 | 1.340 | 72.4 | 6.43 | 2 | 1 | 1,560 |
| 20 | 1 | 47.5 | 10 | 38 | 2.600 | 72.7 | 6.36 | 2.1 | 1 | 115 |
| 21 | 2 | 47.5 | 10 | 45 | 2.500 | 73.2 | 6.33 | 2 | 1 | 205 |
| 22 | 0 | 47.5 | 0 | | | | | 8 | 1.5 | 30,000 |
| 23 | 0 | 47.5 | 5 | | | | | 5 | 1 | 20,000 |
| 24 | 0 | 47.5 | 8 | | | | | 3 | 1 | 1,000 |
| 25 | 0 | 47.5 | 10 | | | | | 2 | 1 | 300 |

TABLE II (Egg whites)

| N° $C_1$ to $C_{25}$ | Ingredients NaCl % by weight | Ingredients Sugar % by weight | Duration of bubbling in seconds | Osmotic pressure in atmosphere | Viscosity in centipoise | Dry extract % by weight | pH | Dissolved gas $O_2$ ppm | Dissolved gas $CO_2$ millimole | AEROBIC MESOPHILE FLORA in number of germs (per gram after 72 hours at 30° C. on samples preserved 15 days at 20° C.) |
|---|---|---|---|---|---|---|---|---|---|---|
| 1 | 0 | 0 | 10 | 0 | 5 | 12 | 9.2 | 2 | 33 | >100,000,000 |
| 2 | 5 | 0 | 10 | 38.3 | 20 | 16.4 | 8.95 | 2.1 | 34 | 27,200,000 |
| 3 | 7.5 | 0 | 10 | 57.5 | 25 | 18.6 | 8.80 | 2 | 32 | 252,000 |
| 4 | 9 | 0 | 10 | 69 | 27 | 19.9 | 8.79 | 2 | 33 | 5,000 |
| 5 | 10 | 0 | 10 | 77 | 30 | 20.8 | 8.72 | 1.9 | 32 | 570 |
| 6 | 11 | 0 | 10 | 84.3 | 35 | 21.7 | 8.70 | 2 | 32 | 540 |
| 7 | 12 | 0 | 10 | 92 | 35 | 22.5 | 8.70 | 1.9 | 31 | 410 |
| 8 | 15 | 0 | 10 | 115 | 35 | 25.2 | 8.60 | 2 | 30 | 320 |
| 9 | 0 | 10 | 10 | 6.5 | 45 | 20.8 | 9.2 | 2 | 27 | >100,000,000 |
| 10 | 0 | 20 | 10 | 13 | 45 | 29.6 | 9.1 | 1.9 | 26 | >100,000,000 |
| 11 | 0 | 30 | 10 | 19.6 | 60 | 38.4 | 9 | 2 | 24 | 26,500,000 |
| 12 | 0 | 40 | 10 | 26 | 100 | 47.2 | 8.90 | 2 | 25 | 12,300 |
| 13 | 0 | 45 | 10 | 29.4 | 190 | 51.6 | 8.85 | 2.3 | 26 | 580 |
| 14 | 0 | 47.5 | 10 | 31 | 190 | 53.8 | 8.80 | 2.1 | 24 | 270 |
| 15 | 0 | 50 | 10 | 32.6 | 240 | 56 | 8.75 | 2 | 25 | 150 |
| 16 | 0.5 | 45 | 10 | 33.2 | 160 | 52 | 8.80 | 2.1 | 25 | 750,000 |
| 17 | 1 | 45 | 10 | 37.1 | 140 | 52.5 | 8.70 | 2.2 | 24 | 138,000 |
| 18 | 2 | 45 | 10 | 44.8 | 140 | 53.4 | 8.65 | 2.1 | 23 | 3,500 |
| 19 | 0.5 | 47.5 | 10 | 34.8 | 180 | 54.2 | 8.75 | 2.1 | 24 | 990 |
| 20 | 1 | 47.5 | 10 | 38 | 180 | 54.7 | 8.70 | 2 | 25 | 750 |
| 21 | 2 | 47.5 | 10 | 45 | 170 | 55.6 | 8.60 | 2.3 | 24 | 600 |
| 22 | 0 | 47.5 | 0 | | | | | 10 | 26 | 2,770,000 |
| 23 | 0 | 47.5 | 5 | | | | | 5 | 24 | 250,000 |
| 24 | 0 | 47.5 | 8 | | | | | 2.4 | 23 | 900 |
| 25 | 0 | 47.5 | 10 | | | | | 2 | 23 | 270 |

TABLE III

| Type of egg product | Ex. N° | Initial egg product | | | Ingredients | | O₂ in ppm | End of stages (a) & (b) number of germs per g | Stage (c) | | Final Product** | | | | |
|---|---|---|---|---|---|---|---|---|---|---|---|---|---|---|---|
| | | Number of germs per g* | % of non-concentrated dry extract | % of concentrated dry extract | % NaCl in g | Sugar % in g | | | Temp °C | Duration hours | % dry extract | O₂ ppm | Number of germs per g | Proteins | State |
| Yolks | F₁ | 380,000 | 44 | | 0 | 50 | 2.9 | | 65 | 72 | 72.0 | 0.5 | <10 | ND | NC |
| | F₂ | 270,000 | 44 | | 12 | 0 | 2.5 | | 55 | 24 | 50.7 | 0.4 | 520 | ND | NC |
| | F₃ | | 44 | | 5 | 0 | 2.3 | 350 | 60 | 24 | | 0.5 | 90 | ND | NC |
| | F₄ | | 44 | | 0 | 40 | 2.2 | 1,500 | 55 | 48 | | 0.5 | 50 | ND | NC |
| Whites | G₁ | 69,000 | | 33 | 11 | 0 | 2.7 | | 50 | 24 | 40.4 | 0.5 | 3,200 | ND | NC |
| | G₂ | 69,000 | | 33 | 0 | 50 | 2.5 | | 65 | 24 | 66.5 | 0.5 | 600 | ND | NC |
| | G₃ | 90,000 | | 33 | 1.5 | 35 | 2.8 | 9,300 | 60 | 24 | | | 90 | ND | NC |
| | G₄ | 90,000 | | 33 | 0 | 35 | 2.7 | 6,700 | 60 | 48 | | | 70 | ND | NC |
| | G₅ | 90,000 | | 33 | 5 | 0 | 2.1 | | 50 | 72 | | 0.5 | 2,700 | ND | NC |
| Whole eggs | H₁ | 510,000 | | 48 | 9 | 0 | 2.7 | | 50 | 72 | 53.7 | 0.3 | 30 | ND | NC |
| | H₂ | 450,000 | | 48 | 0 | 50 | 2.6 | | 65 | 48 | 74.0 | 0.3 | 80 | ND | NC |
| | H₃ | 420,000 | | 48 | 5 | 0 | 2.5 | | 50 | 72 | | 0.5 | 500 | ND | NC |
| | H₄ | 820,000 | | 48 | 0 | 35 | 2.2 | | 55 | 72 | | 0.5 | 210 | ND | NC |
| | H₅ | 950,000 | | 48 | 0.5 | 33 | | | 55 | | | 0.9 | 260 | ND | NC |

NC = Not coagulated
ND = Not deteriorated
*before concentration
**after 72 hours at 30° C. for a product already preserved 15 days at 20° C.

What is claimed is:

1. In a salt- or sugar-containing raw egg product designed for maintenance at room temperature prior to inclusion in a recipe, the improvement which comprises:

(a) incorporating in said raw egg product sufficient salt, sugar or mixture thereof to provide an osmotic pressure of at least 20 atm;

(b) removing substantially all oxygen which could lead to recognizable spoilage or deterioration when said raw egg product is stored at room temperature for a prolonged period of time, said removal comprising treating said egg product to a temperature which avoids coagulation and deterioration of protein contained in said egg product, whereby the total amount of oxygen that results is less than 3 ppm;

(c) subjecting the deoxygenated and salted- or sugared-egg product mixture to a temperature below the coagulation and protein-deteriorating temperature for a period sufficient to substantially destroy any bacterial contaminants; and (d) storing the resultant product at conditions to maintain the oxygen level below 3 ppm and to avoid bacterial contamination.

2. The product of claim 1, wherein the oxygen content is not more than 1 ppm.

3. The product of claim 1, wherein step (a) occurs subsequent to step (b).

4. The product of claim 1, wherein step (c) is at least 24 hours.

5. The product of claim 1, wherein said raw egg product is concentrated.

6. The product of claim 1, which is stored for a prolonged period of time of from 6 to 8 months.

7. A process for manufacture of a salted or sugared uncooked egg mixture having prolonged shelf life which comprises whole or separated egg which is substantially devoid of sufficient oxygen whereby there is avoided recognizable spoilage or deterioration that would result in any noticeable change in appearance that could otherwise occur during a prolonged period under conditions of room temperature, which comprises:

(a) mixing uncooked egg and sufficient salt or sugar to form an egg mixture having an osmotic pressure of at least 20 atm;

(b) removing substantially all oxygen by treating said uncooked egg mixture to a temperature which avoids coagulation and deterioration of protein contained in said egg mixture, whereby the total amount of oxygen that results is less than 3 ppm;

(c) subjecting the deoxygenated, salted or sugared uncooked egg mixture to a temperature below the coagulation and protein-deteriorating temperature for an extended period sufficient to substantially destroy any bacterial contaminants; and (d) storing said egg mixture under conditions which maintain a level of not more than 3 ppm oxygen and avoid bacterial contamination.

8. The process of claim 7, wherein the oxygen content is not more than 1 ppm.

9. The process of claim 7, wherein step (a) occurs subsequent to step (b).

10. The process of claim 7, wherein step (c) is at least 24 hours.

11. The process of claim 7, wherein said egg mixture is concentrated.

12. The process of claim 7, wherein said egg mixture is stored for a prolonged period of time of from 6 to 8 months.

13. A salted- or sugared-raw egg mixture having prolonged shelf life and designed for maintenance at room temperature prior to inclusion in a recipe comprising a mixture of (a) uncooked whole or separated egg and (b) sufficient salt, sugar, or a mixture thereof to provide an osmotic pressure to said raw egg mixture of at least 20 atm, said mixture having been treated by (1) removing substantially all oxygen that could lead to recognizable spoilage or deterioration when said raw egg mixture is stored at room temperature for a prolonged period of time by bubbling nitrogen through said raw egg mixture to achieve an oxygen content therein of less than 3 ppm;

(2) subjecting the deoxygenated and salted- or sugared-raw egg mixture to a temperature below the coagulation and protein-deteriorating temperature for a period sufficient to substantially destroy any bacterial contaminants; and (3) storing the resultant raw egg mixture at conditions to maintain the oxygen level below 3 ppm and to avoid bacterial contamination.

14. The mixture of claim 13, wherein the oxygen content is not more than 1 ppm.

15. The mixture of claim 13, wherein said raw egg mixture is concentrated.

16. A salted- or sugared-raw egg mixture having prolonged shelf life and designed for maintenance at room temperature prior to inclusion in a recipe comprising a mixture of (a) uncooked whole or separated egg and
(b) sufficient salt, sugar, or a mixture thereof to provide an osmotic pressure to said raw egg mixture of at least 20 atm, said mixture having been treated by (1) removing substantially all oxygen that could lead to recognizable spoilage or deterioration when said raw egg mixture is stored at room temperature for a prolonged period of time by (i) placing said raw egg mixture in a chamber, (ii) creating a vacuum in said chamber of less than 80 tores, and (iii) regulating the oxygen content until it is less than 3 ppm;

(2) subjecting the deoxygenated and salted- or sugared-raw egg mixture to a temperature below the coagulation and protein-deteriorating temperature for a period sufficient to substantially destroy any bacterial contaminations; and (3) storing the resultant raw egg mixture at conditions to maintain the oxygen level below 3 ppm and to avoid bacterial contamination.

* * * * *